US008145548B2

(12) United States Patent
De Luca

(10) Patent No.: US 8,145,548 B2
(45) Date of Patent: Mar. 27, 2012

(54) FOOD VENDING MACHINE SYSTEM INCORPORATING A HIGH SPEED STORED ENERGY OVEN

(75) Inventor: Nicholas P. De Luca, Washington, DC (US)

(73) Assignee: De Luca Oven Technologies, LLC, San Francisco, CA (US)

( * ) Notice: Subject to any disclaimer, the term of this patent is extended or adjusted under 35 U.S.C. 154(b) by 134 days.

(21) Appl. No.: 12/345,899

(22) Filed: Dec. 30, 2008

(65) Prior Publication Data

US 2010/0169196 A1 Jul. 1, 2010

(51) Int. Cl.
*G06F 17/00* (2006.01)

(52) U.S. Cl. ....... 705/34; 221/150 A; 700/233; 219/391; 340/5.92

(58) Field of Classification Search .................... 705/34; 700/233; 221/150 A; 219/10.55 M, 681; 340/5.92
See application file for complete search history.

(56) References Cited

U.S. PATENT DOCUMENTS

| | | | | |
|---|---|---|---|---|
| 3,692,975 | A | 9/1972 | Markus et al. | |
| 4,238,995 | A | 12/1980 | Polster | |
| 4,317,025 | A | 2/1982 | Starnes | |
| 4,734,562 | A | 3/1988 | Amano et al. | |
| 5,097,112 | A | 3/1992 | Kanaya et al. | |
| 5,250,775 | A | 10/1993 | Maehara et al. | |
| 5,598,769 | A | 2/1997 | Luebke et al. | |
| 5,688,423 | A * | 11/1997 | Rudewicz et al. | 219/501 |
| 5,783,927 | A | 7/1998 | Chen | |
| 5,786,568 | A | 7/1998 | McKinney | |
| 5,786,569 | A | 7/1998 | Westerberg | |
| 5,982,645 | A | 11/1999 | Levran et al. | |
| 6,013,900 | A | 1/2000 | Westerberg et al. | |
| 6,037,571 | A | 3/2000 | Christopher | |
| 6,297,481 | B1 | 10/2001 | Gordon | |
| 6,670,586 | B2 | 12/2003 | Ingemanson et al. | |
| 7,002,265 | B2 | 2/2006 | Potega | |
| 7,105,778 | B1 | 9/2006 | DeLong et al. | |
| 7,105,779 | B2 | 9/2006 | Shei | |
| 7,212,735 | B2 | 5/2007 | Konishi | |
| 7,507,938 | B2 * | 3/2009 | McFadden | 219/681 |
| 7,797,204 | B2 * | 9/2010 | Balent | 705/28 |
| 2002/0166890 | A1 | 11/2002 | Hsuan et al. | |
| 2003/0016954 | A1 | 1/2003 | Bikhovsky | |

(Continued)

FOREIGN PATENT DOCUMENTS

DE 102 00 530 A1 7/2003

(Continued)

OTHER PUBLICATIONS

International Search Report and Written Opinionmailed Jun. 27, 2008 for Application No. PCT/US2007/017801 filed Aug. 10, 2007.

(Continued)

*Primary Examiner* — Vanel Frenel
(74) *Attorney, Agent, or Firm* — Winston & Strawn LLP

(57) ABSTRACT

A novel vending machine system integrating a food storage container and a high speed stored energy cooking oven capable of cooking foods in under one minute such as that further described by U.S. Provisional Application 60/822,028 filed on Aug. 10, 2006 as well as co-pending application "Wire Mesh Thermal Radiative Element and Use in a Radiative Oven" filed on Dec. 30, 2008 by De Luca. The invention disclosing a novel configuration for the oven incorporating storage, a system allowing for the proper cooking of items and food positioning, an activation system, and an invoicing system.

34 Claims, 4 Drawing Sheets

U.S. PATENT DOCUMENTS

| | | | | |
|---|---|---|---|---|
| 2005/0100331 | A1 | 5/2005 | Konishi | |
| 2006/0122738 | A1 * | 6/2006 | Yamada et al. | 700/295 |
| 2006/0254432 | A1 * | 11/2006 | McLemore | 99/448 |
| 2007/0194011 | A1 * | 8/2007 | McFadden | 219/681 |
| 2007/0251397 | A1 * | 11/2007 | Dorsten et al. | 99/407 |
| 2008/0213449 | A1 * | 9/2008 | Wisner et al. | 426/520 |
| 2010/0266738 | A1 * | 10/2010 | Wisner et al. | 426/394 |

FOREIGN PATENT DOCUMENTS

| | | |
|---|---|---|
| EP | 1 580 145 A1 | 9/2005 |

OTHER PUBLICATIONS

"Smoke detector," http://en.wikipedia.org/wiki/Smoke_detector, Retrieved on Jul. 17, 2007, pp. 1-7.

* cited by examiner $$\frac{1}{R_{\text{total}}} = \frac{1}{R_1} + \frac{1}{R_2} + \cdots + \frac{1}{R_n}$$

Eq. 5

FOOD VENDING MACHINE SYSTEM INCORPORATING A HIGH SPEED STORED ENERGY OVEN

BACKGROUND OF THE INVENTION

U.S. Provisional Application 60/822,028 filed on Aug. 10, 2006 and pending patent application No. 12/345,939 "Wire Mesh Thermal Radiative Element and Use in a Radiative Oven" filed by De Luca on Dec. 30, 2008, both of which are hereby incorporated by reference in their entirety, describe an oven capable of cooking foods at accelerated times compared to conventional ovens.

Specifically, the oven described consists of a stored energy system of batteries, a switching system, a food holder, and a wire mesh heating element or radiative bulbs used to cook the food. Typical cook times (in seconds) for a system running about 20 KW of power are described below:

| | |
|---|---|
| Thin Slice Toast (white bread) | 3.5 |
| Bagel Half (plain) | 5 |
| Hog Dog (directly from refrigerator) | 20 |
| Pizza (directly from freezer) | 22 |
| Bacon Strips (grilled in fat) | 30-40 |
| Grilled Cheese Sandwich | 10-15 |

The radiant heat bulbs are central to the prior art as they produce the appropriate wavelength of infrared energy required (in the range of 1 to 3 nanometers) and the multiple bulbs provide the intensity. Typical bulbs include halogen based bulbs similar to those produced by companies such as Ushio, Sylvania, or Soneko with power density of approximately 100 w/in$^2$. Although these bulbs are effective at reducing cook times, they have several primary draw backs which have to this point deterred the prior art from successful introduction in the marketplace. Specifically;

1) The price for bulbs is high relative to the entire price required to commercialize a unit such as a toaster.
2) Bulbs can easily get damaged by oils and grease common in the cooking process.
3) Use of glass shielding over the bulbs decreases the intensity of the radiant energy.
4) Although fewer, longer, high voltage bulbs can be used, the voltage poses safety risks and therefore, low voltages are preferable. Unfortunately though, the use of smaller bulbs further requires that many bulbs be used; complicating manufacturing and overall pricing issues.

Another method for heating involves the use of Nichrome wire. Nichrome wire is commonly used in appliances such as hair dryers and toasters as well as used in embedded ceramic heaters. The wire has a high tensile strength and can easily operate at temperatures as high as 1250 degrees Celsius.

Nichrome has the following physical properties:

| Material property | Value | Units |
|---|---|---|
| Tensile Strength | $2.8 \times 10^8$ | Pa |
| Modulus of elasticity | $2.2 \times 10^{11}$ | Pa |
| Specific gravity | 8.4 | None |
| Density | 8400 | kg/m$^3$ |
| Melting point | 1400 | ° C. |
| Electrical resistivity at room temperature | $1.08 \times 10^{-6}$ | $\Omega \cdot$ m |
| Specific heat | 450 | J/kg ° C. |
| Thermal conductivity | 11.3 | W/m/° C. |
| Thermal expansion | $14 \times 10^{-6}$ | m/m/° C. |

Standard ambient temperature and pressure used unless otherwise noted.

When considering the use of Nichrome within an oven it is important to consider not only the resistive characteristics but also the black body emission of the element when hot.

With regard to the general characterization of resistive elements,

The resistance is proportional to the length and resistivity, and inversely proportional to the area of the conductor.

$$R = \frac{L}{A} \cdot \rho = \frac{L}{A} \cdot \rho_0(\alpha(T - T_0) + 1) \quad \text{Eq. 1}$$

where $\rho$ is the resistivity: $\rho = \frac{1}{\sigma}$;

L is the length of the conductor, A is its cross-sectional area, T is its temperature, $T_0$ is a reference temperature (usually room temperature), $\rho_0$ is the resistivity at $T_0$, and $\alpha$ is the change in resistivity per unit of temperature as a percentage of $\rho_0$. In the above expression, it is assumed that L and A remain unchanged within the temperature range. Also note that $\rho_0$ and $\alpha$ are constants that depend on the conductor being considered. For Nichrome™, $\rho_0$ is the resistivity at 20 degrees C. or $1.10\times10^{-6}$ and $\alpha$=0.0004. From above, the increase in radius of a resistive element by a factor of two will decrease the resistance by a factor of four; the converse is also true.

Regarding the power dissipated from a resistive element, where, I is the current and R is the resistance in ohms, v is the voltage across the element, from Ohm's law it can be seen that, since v=iR, $$P=i^2R$$

In the case of an element with a constant voltage electrical source, such as a battery, the current passing throught the element is a function of its resistance. Replacing R from above, and using ohms law, $$P=v^2/R=v^2A/\rho_0L \quad \text{Eq.2}$$

In the case of a resistive element such as a nichrome wire the heat generated within the element quickly dissipates as radiation cooling the entire element.

Now, considering the blackbody characterization of the element:

Assuming the element behaves as a blackbody, the Stefan-Boltzmann equation characterizes the power dissipated as radiation:

$$W=\sigma \cdot A \cdot T^4 \quad \text{Eq.3}$$

Further, the wavelength $\lambda$, for which the emission intensity is highest, is given by Wien's Law as:

$$\lambda_{max} = \frac{b}{T} \quad \text{Eq. 4}$$

Where,

σ is the Stefan-Boltzmann constant of $5.670\times10^{-8}$ $W\cdot m^{-2}\cdot K^{-4}$ and, b is the Wien's displacement constant of 2.897×10−3 m·K.

In an application such as a cooking oven, requiring a preferred operating wavelength of 2 microns (2×10E−6) for maximum efficiency, the temperature of the element based on Wein's Law should approach 1400 degrees K or 1127 degrees C. From the Stefan-Boltzmann equation, a small oven with two heating sides would have an operating surface area of approximately 4 ×0.25 m ×0.25 m or 0.25 $m^2$. Thus, W should aproach 20,000 Watts for the oven.

In the case of creating a safe high power toaster or oven it is necessary for the system to operate at a low voltage of no more than 24 volts. Thus, using Eq. 2 with 20,000 W, the element will have a resistance of approximately 0.041 ohms, if 100% efficient at the operating temperature. Based on Eq. 1, a decrease in operating temperature to room temperature (from 1400 to 293 K) represents an approximate decrease in the resistivity of the element by about 1.44 times, and therefore an element whose resistance at room temperature is .0284 ohms is required.

Now, considering the relationship of the resistance of the element and the characterization of the element as a blackbody:

The ratio of the resistance of the heater to the black body radiative area of the same heater becomes the critical design constraint for the oven; herein termed the "De Luca Element Ratio." The ideal oven for foods operating over a 0.25 square meter area at 2 micron wavelength has a De Luca Element Ratio (at room temperature), of 0.1137 ohms/$m^2$ (0.0284 ohms/0.25 $m^2$). The De Luca Element Ratio is dependant solely on the resistance of the material and the radiative surface area but is independent of the voltage the system is operated. In addition, for wire, the length of the wire will not change the ratio.

Table 1 lists the resistance per meter of several common nichrome wire sizes as well as the De Luca Element Ratio for these elements. It is important to note that all these wires have a De Luca Element Ratio far greater than the 0.1137 required for an oven operated at 1400 K, 24 V, and over 0.25 $m^2$. Clearly the use of a single wire with a voltage placed from end-to-end in order to achieve the power requirement is not feasible. In contrast, a houshold pop-toaster, operated at 120V and 1500 W, over a smaller 0.338 $m^2$ area at 500 K would require a De Luca Element Ratio of 35.5. Thus a 1 meter nichrome wire of 0.001 m radius with a 120 V placed across it would work appropriately.

TABLE 1

| Wire Radius (m) | Cross Sectional Area ($m^2$) | Resistance Per Meter Length (ohms) | Surface Area of 1 meter length ($m^2$) | Weight Per Meter (g) | De Luca Element Ratio (at room temp) | Time To Reach 1400K At 20 kw (sec) |
|---|---|---|---|---|---|---|
| 0.01 | 3.14E−04 | 0.0034 | 0.0628 | 2637 | 0.1 | 65.4 |
| 0.0015 | 7.06E−06 | 0.15 | 0.00942 | 59.3 | 16.2 | 1.47 |
| 0.001 | 3.14E−06 | 0.30 | .00628 | 26.3 | 47.7 | 0.654 |
| .0005 | 7.85E−07 | 1.38 | .00314 | 6.6 | 438 | 0.163 |
| 0.000191 | 1.139E−07 | 11.60 | 0.00120 | 0.957 | 9670 | 0.024 |
| 0.000127 | 5.064E−08 | 24.61 | 0.00079 | 0.425 | 30856 | 0.010 |
| 0.000022 | 1.551E−09 | 771.21 | 0.000138 | 0.013 | 5580486 | 0.0003 |

Clearly a lower resistance or a higher surface area is required to achieve a De Luca Element Ratio of close to 0.1137.

One way to achieve the De Luca Ratio of 0.1137 would be to use a large element of 2 cm radius. The problem with this relates to the inherent heat capacity of the element. Note from Table 1 that to raise the temperature to 1400 K from room temperature would require 65.4 seconds and thus about 0.36 KWH of energy.

This calculation is derived from the equation relating heat energy to specific heat capacity, where the unit quantity is in terms of mass is:

$$\Delta Q = mc\Delta T$$

where ΔQ is the heat energy put into or taken out of the element (where P×time=ΔQ), m is the mass of the element, c is the specific heat capacity, and ΔT is the temperature differential where the initial temperature is subtracted from the final temperature.

Thus, the time required to heat the element would be extraordinarily long and not achieve the goal of quick cooking times.

Another way for lowering the resistance is to place multiple resistors in parallel. Kirkoff's laws predict the cumulative result of resistors placed in parallel (FIG. 4).

The following Table 2 lists the number of conductors for each of the elements in Table 1, as derived using equation 5, that would need to be placed in parallel in order to achieve a De Luca Element Ratio of 0.1137. Clearly placing and distributing these elements evenly across the surface would be extremely difficult and impossible for manufacture. Also note that the required time to heat the combined mass of the elements to 1400 K from room temperature at 20 KW for elements with a radius of greater than 0.0002 meters is too large with respect to an overall cooking time of several seconds.

TABLE 2

| Wire Radius (m) | De Luca Element Ratio for single element (@ Room Temp) | Number of Parallel Elements Required to Achieve De Luca Ratio of 0.1137 | Total Weight/ Meter (g) | Time To Reach 1400K At 20 kw (sec) From Room Temp |
|---|---|---|---|---|
| 0.01 | 0.1 | 1 | 2637 | 65.4 |
| 0.0015 | 16.2 | 12 | 711 | 17.6 |
| 0.001 | 47.7 | 22 | 579 | 14.4 |
| .0005 | 438 | 63 | 415 | 10.3 |
| 0.000191 | 9670 | 267 | 255 | 6.3 |
| 0.000127 | 30856 | 493 | 209 | 5.2 |
| 0.000022 | 5580486 | 6838 | 88 | 2.18 |

In summary, the following invention allows for the creation of a high power oven by using a resistive mesh element. The heater element designed so as to allow for the desired wavelength output by modifying both the thickness of the mesh as well as the surface area from which heat radiates. The heater consisting of a single unit mesh that is easily assembled into the oven and having a low mass so as to allow for a very quick heat-up (on the order of less than a few seconds).

Specifically, the wire mesh cloth design calibrated to have the correct De Luca Element Ratio for a fast response (less than 2 sec) oven application operating at 1400 degrees K.

To date, the best mesh design for operating a quick response time oven is a nichrome wire mesh with strand diameter of 0.3 mm, and spacing between strands of 0.3 mm, and operating voltage of 24 V.

Although the stored energy high speed oven would appear to have significant commercial use, in practice, there are several key inherent obstacles that have inhibited the oven's success. Specifically, 1) A unit able to be operated several times sequentially has a battery weight over 50 lbs and this is too high for most people to easily handle and allow for easy moving of the unit.
2) A unit able to be operated several times sequentially has a relatively high unit cost compared to slow speed cooking units such as toasters or toaster ovens due to battery cost.
3) Due to the high speed cook cycle, variances of a few seconds in cooking can significantly affect the quality of the cooked foods.
4) Due to the high power of the oven, variations in the proximity of the food to the heating elements (which is a function of the position of the internal oven's food holding grates) can significantly affect the quality of the cooked foods.

The integration of a high speed oven with a vending machine system similar to that for beverages at first pass would appear to ease some of the inherent difficulties to commercialization of high speed stored energy ovens. Specifically, 1) Vending machine systems tend to be placed in a stationary location and thus the need for a light weight unit is not as necessary.
2) Vending machine systems rely on the sale of the items within the unit and thus can amortize machine costs over a larger time frame.
3) Vending machine systems tend to be customized for specific foods and thus automatic control of cooking times and oven control parameters can be preprogrammed.

Recently, conventional oven technology has been used in combination with vending systems for the sale of pizzas. Specifically, Wonderpizza of New Bedford, Mass. has developed a vending system as well as Tombstone Pizza, a division of Kraft Foods of Winnetka, Ill. Both systems are similar in size to commercial vending machines for sodas, on the order of 1 meter by 1 meter by 2 meters tall, and incorporate ovens. Several problems with the units exist though:

1) In order for the vending machines to deliver pizza in a reasonable time when operated at 120V, the systems must maintain the cooking elements in a preheated state which wastes a significant amount of energy and makes them expensive to operate.
2) The units have limited versatility as the vending machine is structured to only process the pizza that has been stocked in the machines and they do not allow a user to insert a to-be-cooked food that they desire.
3) In addition, because the storage of the food is inherently coupled to the cooking, a robotic system is required to handle the food which can easily lead to jams and malfunction.
4) Another difficulty with the units relates to the large size of the units which thus limits the market in which the units can be sold as many offices do not have the space required.
5) Further, the handling of cash payments can increase the overall volume of the unit and complicate the servicing of the vending machine.

One vending system that is much more flexible than a conventional beverage vending machine is manufactured by Bartech Systems International of Millersville, Md. These units rely on an electronic communication system and infrared sensing technology to detect which items have been removed from the holding container (most generally the container being a small refrigerator sized unit). When an item is removed from the container, the sensor detects the missing item from the shelf or pocket and subsequently sends an electronic signal to a control module which may include a internet web based system. While this vending system works well for the sale of individual items removed from the unit, it does not provide the necessary elements for integration with a high speed cooking oven or secondary vending process associated with a high speed stored energy oven.

In considering the combination of a high speed stored energy oven incorporating batteries, such as that described in U.S. Provisional Application 60/822,028 filed on Aug. 10, 2006 and patent application "Wire Mesh Thermal Radiative Element and Use in a Radiative Oven" filed by De Luca on Dec. 29, 2008, with a vending machine system, several difficulties arise. Specifically:

1) The high weight of the batteries requires that their placement be considered to insure the stability of the machine. This position may not be ideal with respect to the positioning of the oven or food storage units.
2) The separation of the oven from the stored energy source requires appropriate sizing and positioning of the high current elements.

OBJECTS OF THE INVENTION

It is therefore an object of the current invention to provide a novel food vending machine system incorporating a high speed oven stored energy that overcomes the obstacles of traditional vending machines. Specifically, 1) The vending machine allows for the greatest flexibility with regard to the various types of foods that can be stored and cooked in the oven.
2) The vending machine allows for hand picking of stored items and hand placement of the food item within the high speed cooking stored energy oven to insure it is as inexpensive as possible and as flexible as possible.
3) The vending machine should automatically adjust the oven settings with respect to the product placed within it.
4) Various foods may be stored and easily swapped from the unit without requiring modifications to any of the mechanical or electrical systems.
5) The vending machine should be designed so as to insure it is as stable and safe as possible if incorporating batteries and high current elements.
6) The vending system should allow for ease of invoicing and the ability to charge a customer for both the food and cooking processes.
7) The vending machine should be as small as possible to allow for placement within offices as well as homes.

SUMMARY OF THE INVENTION

In summary, the invention consists of a high power stored energy oven coupled to a food storage container and an electronic control system to allow for control of the oven based on the food placed within the oven. The food storage container generally outfitted with a refrigeration unit to allow for chilling or freezing of foods and a sensor system to detect the placement or removal of a food or packaged food. Due to the weight and bulk of the energy storage system for the oven, it is generally located below the container, with high current bus bars extending between the oven and the energy storage system along the sides or back of the container.

The electronic control system communicating between the food storage container and the oven to allow for monitoring of the items removed from the container and sensing of the items to be cooked at the oven. Sensing technologies such as infrared, bar codes, vision cameras, radio frequency tags, and bar codes can be used with the container or oven to determine the item removed from them or placed within them. The oven cooking parameters including running voltage, cycle times, cycle profile, rack spacing, and fan speeds.

The invoicing and billing components of the vending system allowing for the incorporation of a user identification system by employing a coded id card fitted with a radio frequency chip, a magnetic strip, or a bar code and further synchronizing the system to a web portal through the internet. The billing system allowing the vending system service provider to charge a customer for either the food, or the use of oven, or both.

Preferred and best mode designs and forming techniques are hereafter described.

DRAWINGS

The invention will now be described in connection with the accompanying drawings in which.

DESCRIPTION OF PREFERRED EMBODIMENT(S)

Figure 1:
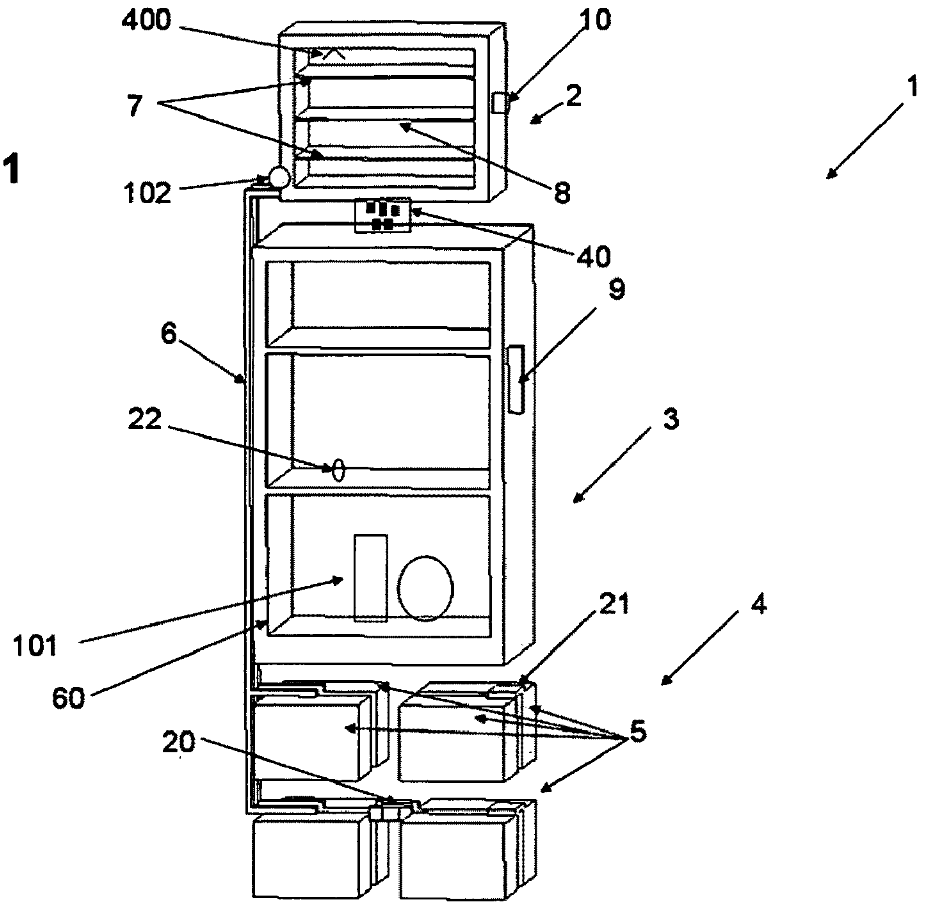
FIG. 1 is an isometric view of the vending machine indicating the primary components of the system.

In FIG. 1, vending system 1 consists of the high speed stored energy oven 2, the food storage container 3, and the stored energy and switching system 4. The oven 2 consisting of top and bottom heater elements 7, preferably of the wire mesh type as described by De Luca in co-pending application "Wire Mesh Thermal Radiative Element and Use in a Radiative Oven" filed by De Luca on Dec. 30, 2008, as well as movable tray 8.

When using batteries, the stored energy and switching system 4 may be very heavy and thus is most preferably placed at the bottom of the entire vending system 1 to insure that the unit is not top heavy.

In use, food items 101 which may be packaged are placed in storage container 3 upon shelving or trays 60. The container 3 may be further refrigerated, generally at temperatures ranging from −30 to +10 degrees Celsius. Sensor 22 will detect the items or their presence on the trays 60 and communicate to the central processing unit 40.

When desired, a user would most generally scan their identification card via a magnetic swipe 9 and remove item or items 101 from the food container 3. Upon removal from food container 3, registration that the item has been removed from container 3 is sent to the processor 40. Processor 40 may obtain the cooking information from its own memory system or through access to an off site database connected through the internet.

Once obtained from storage container 3 the food may be unwrapped and subsequently placed on tray 8 for cooking. Identification of the food item 101 on tray 8 may be done via sensor 10 which, most preferably, is a bar code scanner able to read a code placed on the packaging of food item 101. A vision system may also be used to detect the type of food placed on tray 8 through processor 40 and detector 10.

With confirmation of the item to be cooked within oven 2, the oven parameters are changed automatically, including running voltage, cycle times, cycle profile, the spacing between tray 8 and heating elements 7, and fan speeds. Start button 102 is subsequently pressed, sending a signal to controller 40 and control relays 20. The power originates from batteries 5 and the current passes through connectors 21 and bus bars 6 to allow for heating of the heater elements 7. The timing and pulsation width of the cycle controlled by the processor 40. When cooked, the food item is removed from oven 2 as detected by sensor 10 and the information is transmitted via processor 40 to the associated user account.

Figure 2:
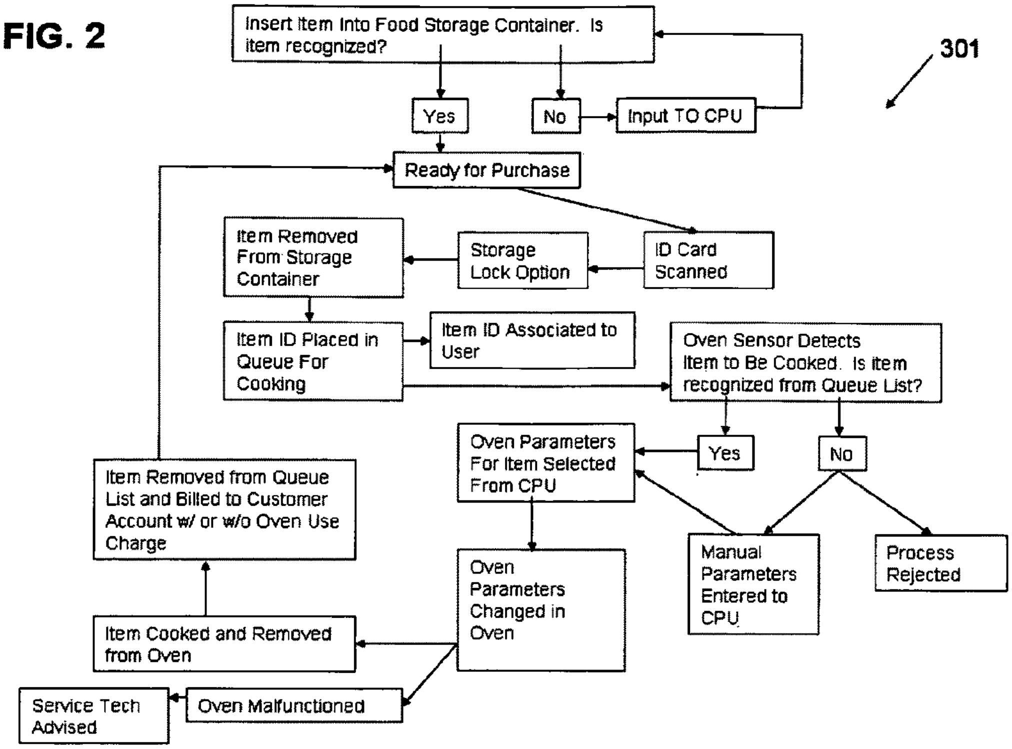
FIG. 2 is a schematic diagram illustrating the vending process incorporating a high speed stored energy oven.

FIG. 2 is a schematic diagram illustrating the vending process 301 incorporating a high speed stored energy oven. The process as described by the flow chart allowing for control of the use of the oven and gives the vendor the option to charge a customer for not only the food but also for the cycle associated with running the oven. The process also enabling the use of a centralized data system to help associate a customer's buying habits, food preferences, and billing. The system can also be used to advise of oven failures and help to insure the storage container 3 of FIG. 1 is stocked based on preferences. The dual nature of sensing the items both when removed from the storage container and further when cooked, giving the service provider the option to sell items from container 3 that do not need to be cooked in high speed oven 2 of FIG. 1.

Figure 3:
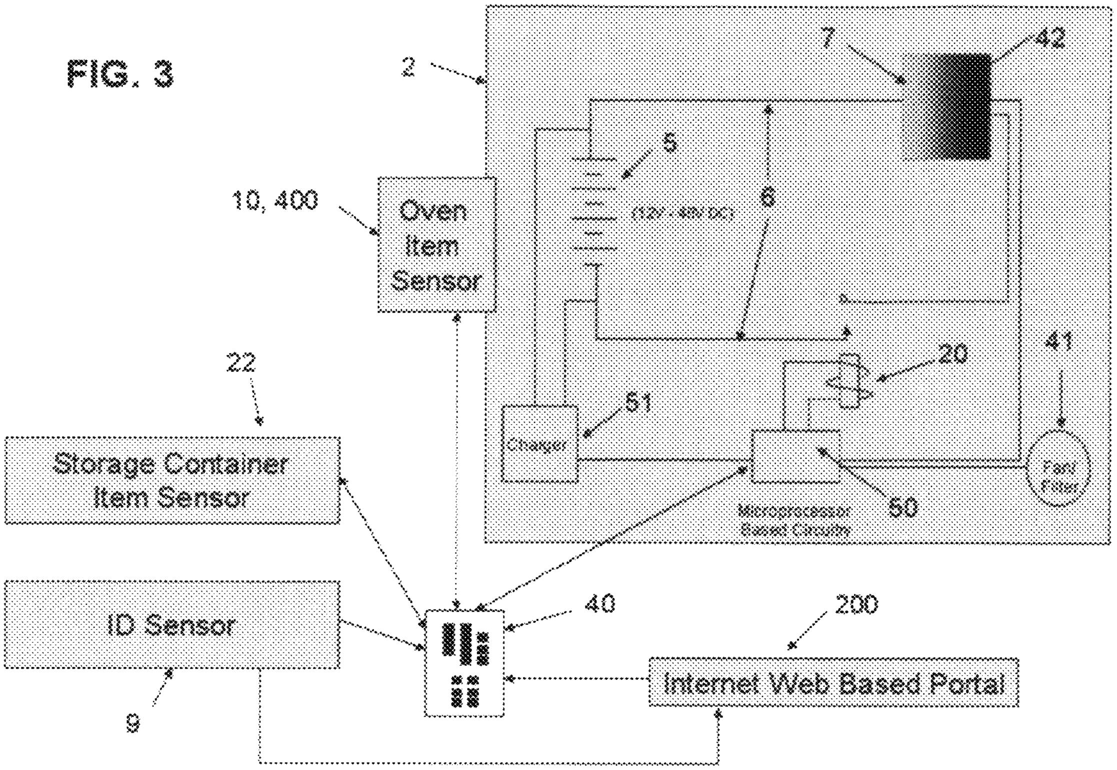
FIG. 3 is a schematic diagram of the electronic control system.
Figure 4:
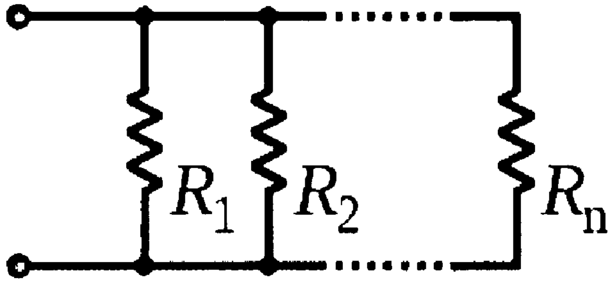
FIG. 4 is a schematic of the resistance of multiple resistors in parallel.

FIG. 3 is a schematic diagram of the electronic control system illustrating the centralized function of the primary processor 40 in relation to the storage container item sensor 22, the user identification sensor 9, the oven item sensor 10 or 400, and the oven's microprocessor control 50. Charger 51 is also shown on the schematic for the oven 2 as well as the mesh heating elements 7, temperature control sensor 42 and relays 20. An air filter system is controlled by the oven's microprocessor 50. Cooking based on information relating to the food type may be communicated by the primary processor 50 through, in some cases, information received from a web based information portal 200.

What is claimed is:

1. A vending machine comprising:

a high speed stored energy oven including a heater element capable of cooking foods at accelerated times;

a food storage container; and an energy storage device used to power the heater element.

2. The vending machine of claim 1, wherein the high speed stored energy oven is capable of cooking foods in under 1 minute.

3. The vending machine of claim 1, wherein the food storage container is refrigerated so as to keep foods chilled and/or frozen.

4. The vending machine of claim 1, wherein the food storage container is accessible by the end-user or consumer of the food.

5. The vending machine of claim 1, wherein the food storage container is equipped with a sensing mechanism to detect the type of food placed into or removed from the container.

6. The vending machine of claim 5, wherein the sensing mechanism comprises radio frequency, vision, weight, infrared, or bar code sensing equipment.

7. The vending machine of claim 5, further comprising an electronic transmission system to communicate which foods have been placed into or removed from the storage container.

8. The vending machine of claim 1, further comprising an electronic control and communication system.

9. The vending machine of claim 8, wherein the electronic control and communication system includes a communication system to transmit and receive information detailing the type of food removed from the storage container.

10. The vending machine of claim 9, further comprising an oven controller that has operating parameters changed by information detailing the type of food removed from the storage container.

11. The vending machine of claim 10, wherein the oven controller includes parameters for operating the oven, wherein the parameters includes one or more of running voltage, cycle times, cycle profile, rack spacing, and fan speeds.

12. The vending machine of claim 1, wherein the energy storage system is located below or partially below the food storage container.

13. The vending machine of claim 1, wherein the energy storage system comprises batteries.

14. The vending machine of claim 1, wherein the high speed stored energy oven is located above or partially above the food storage container.

15. The vending machine of claim 1, wherein the high speed stored energy oven further comprises a sensing mechanism to detect the food placed within it 16. The vending machine of claim 15, wherein the sensing mechanism comprises radio frequency, vision, weight, infrared, or bar code sensing equipment.

17. The vending machine of claim 15 further comprising a transmission system to transmit information obtained by the sensing mechanism regarding the food placed within the oven to a control system.

18. The vending machine of claim 1, wherein the heater element includes a wire mesh element.

19. A process of vending foods comprising:

placing one or more foods within a storage container;

detecting the one or more foods removed from the storage container within close proximity to or within a high speed cooking oven including a heater element powered by an energy storage device;

modifying parameters associated with the operation of the high speed cooking oven based on the detection of the type of food to be cooked within the high speed cooking oven;

cooking the foods within the high speed cooking oven; and removing the cooked foods from the high speed cooking oven.

20. The process of vending foods of claim 19 further comprising:

detecting the food removed from the storage container within close proximity to or within a high speed cooking oven; and modifying parameters associated with the operation of the high speed cooking oven based on the detected food.

21. The process of claim 19 further comprising:

registering the items placed within the storage container to a data registry system; and detecting the one or more items removed from the storage container and comparing the item or items to the data registry system.

22. The process of claim 19, wherein information is transferred electronically between a data registry system, a high speed oven, and a food storage container.

23. The process of claim 19, wherein the storage container is physically accessible by the end-user.

24. The process of claim 19, wherein the heater element includes a wire mesh element.

25. A process of purchasing food using a vending system comprising:

selecting the food item desired to be cooked from a storage container;

scanning the package or participating in an action allowing for the sensing of the item to be cooked;

placing the item within a high speed cooking oven including a heater element powered by an energy storage device; and removing the cooked item from the high speed cooking oven.

26. The process of purchasing food of claim 25 further comprising:

pressing an activation switch.

27. The process of purchasing food of claim 25 further comprising:

identifying oneself as the user of the high speed cooking oven via electronic means.

28. The process of claim 27 in which said process involves the use of an id card fitted with a bar code, magnetic stripe, radio frequency chip, or other identification.

29. The process of claim 27 in which said identification is linked to an interne account for billing and cooking preference purposes.

30. The process of claim 25 further comprising charging or invoicing for the food as well as the high speed oven cooking cycle.

31. The process of claim 25, wherein the heater element includes a wire mesh element.

32. The process of invoicing or charging a customer for the use of a vending machine incorporating both a storage receptacle for food and a food cooking or conversion equipment comprising the steps of:

determining a cycle charge for the use of the conversion or cooking process; and billing, invoicing, or obtaining legal tender in compensation for the cycle charge associated with the use of the conversion or cooking process;

wherein said food cooking or conversion equipment is a high speed stored energy oven powered by an energy storage device.

33. The process of claim 32 further comprising:

determining a charge for the food sold in the vending machine; and billing, invoicing, or obtaining legal tender in compensation for the food sold and used in the conversion or cooking process.

34. The process of claim 32, wherein the high speed stored energy oven includes a heater element and the heater element is powered by the energy storage device.

* * * * *

UNITED STATES PATENT AND TRADEMARK OFFICE

CERTIFICATE OF CORRECTION

PATENT NO. : 8,145,548 B2
APPLICATION NO. : 12/345899
DATED : March 27, 2012
INVENTOR(S) : De Luca It is certified that error appears in the above-identified patent and that said Letters Patent is hereby corrected as shown below:

Title Page:
Item (56) References Cited, OTHER PUBLICATIONS, after “International Search Report and Written”, change “Opinionmailed” to -- Opinion mailed --.

Column 1:
Line 66 (last line of table in column 1), change “$10^{-6}$” to -- $10^{-6[1]}$ --.

Column 3:
Line 3, after “$10^{-8}W \cdot m^{-2} \cdot K^{-4}$; and,” change “b” to -- *b* --.
Line 47, after “feasible.”, start a new paragraph with “In contrast”; and change “houshold” to -- household --.

Column 4:
Line 15, change “ΔQ” to -- Δ*Q* --.
Line 16, change “ΔQ), m” to -- Δ*Q*), *m* --; and change “c” to -- *c* --.
Line 17, change “ΔT” to -- Δ*T* --.

Column 9:
Line 39 (claim 15, line 3), change “it” to -- it. --.

Column 10:
Line 38 (claim 29, line 2), change “interne” to -- internet --.

Signed and Sealed this
Twenty-ninth Day of May, 2012

David J. Kappos
*Director of the United States Patent and Trademark Office*